Nov. 16, 1965  I. D. PRESS  3,218,096
FLUID COUPLING ASSEMBLY
Filed May 19, 1960  2 Sheets-Sheet 1
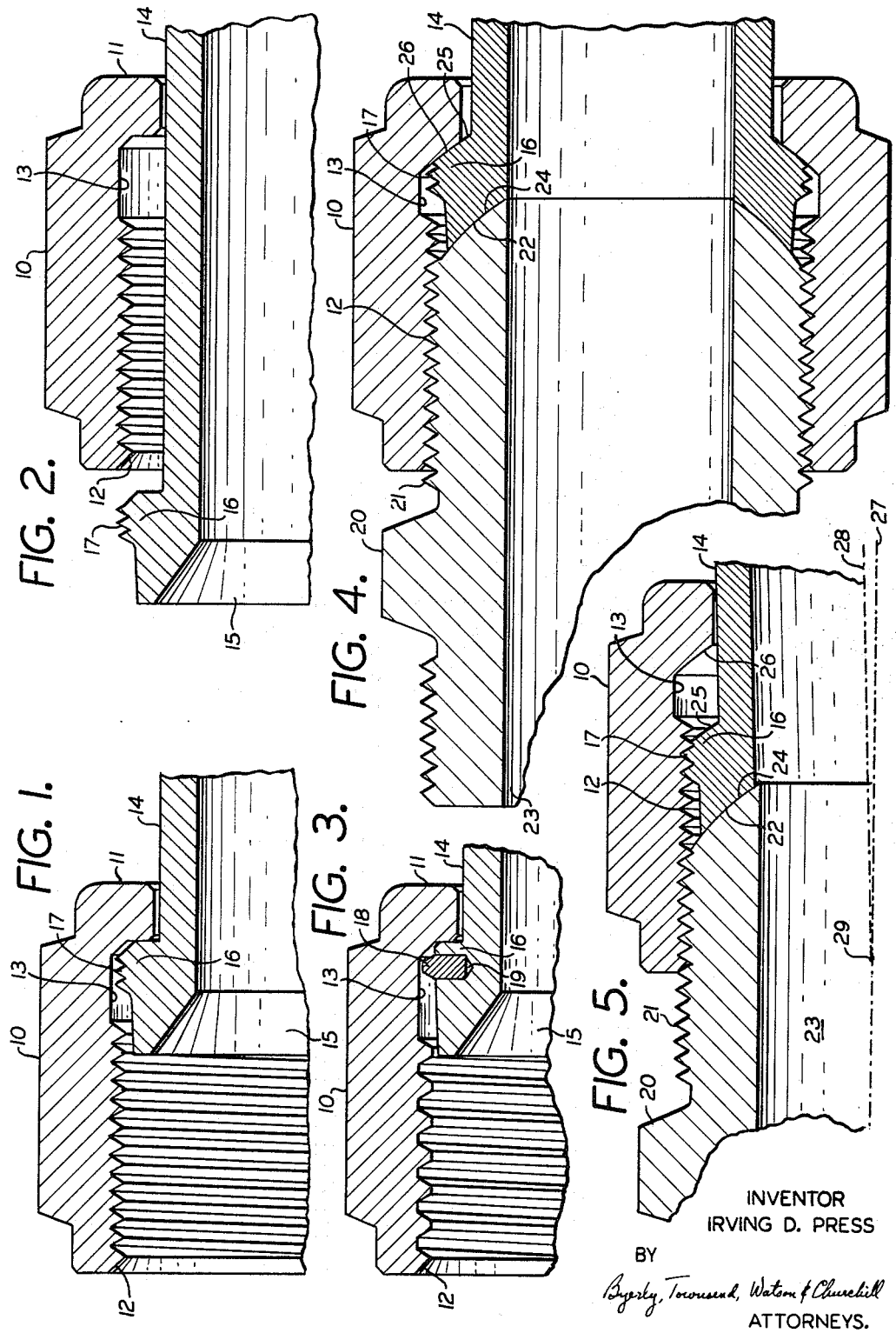
INVENTOR
IRVING D. PRESS
BY
Byerly, Townsend, Watson & Churchill
ATTORNEYS.

United States Patent Office 3,218,096
Patented Nov. 16, 1965

3,218,096
FLUID COUPLING ASSEMBLY
Irving D. Press, West Orange, N.J., assignor to Resistoflex Corporation, Roseland, N.J., a corporation of New York
Filed May 19, 1960, Ser. No. 30,208
6 Claims. (Cl. 285—332.1)

The present invention relates to a fluid coupling assembly and more particularly to threaded couplings which employ coupling or swivel nuts for assembling the joints.

Coupling nuts in common usage at the present time fall generally into either one of two different categories. One category involves those with a flange at the end which engages behind a shoulder on the pipe end for drawing the latter up against a male fitting member. When such a coupling is disengaged, the nut is free to ride up and down the pipe or tube on which it is mounted. This is extremely undesirable in the case of rigid tube plumbing such as used on modern aircraft or missiles since the ends of the tubes are provided with carefully machined fluid sealing surfaces that are exposed to damage in shipment and in normal handling prior to installation.

The other category involves coupling nuts which are permanently secured for rotation at the end of a fluid conduit by staking wires riding in complementary channels or by other forms of swivel connection. Although such a nut is always in position to protect the end seals, another drawback, not found in nuts falling within the first mentioned category, is present. Quite often in rigid plumbing installations the conduits just fit between the mating parts, and insufficient clearance is available to allow for the forward extension of the nut beyond the end of the conduit which carries it. As a consequence, the fittings are strained unduly to create an assembly, which straining shows up later in the form of early or premature failure of the part.

Confronted with the foregoing problem it is an object of the present invention to provide a coupling or swivel nut assembly which combines the advantages of nuts found in both of the presently known categories referred to above while avoiding the disadvantages inherent in each.

In accordance with the present invention the foregoing objective is accomplished in a surprisingly economical and expeditious manner and is readily applicable to an unlimited variety of coupling nut applications.

More specifically, the invention provides a fluid coupling assembly comprising a tubular member, a coupling nut mounted for unrestricted rotation on the member, the nut normally extending beyond one end of the member and being threaded internally, means cooperating with both the nut and the member for preventing axial separation of the nut from the member over the one end, and means cooperating selectively with both the nut and the member for normally preventing retraction of the nut from the one end of the member but being actuable to permit such retraction.

Generally speaking, in accordance with one preferred embodiment of the invention, the coupling nut has an inwardly directed flange at one end with a central opening therethrough and internal threads throughout its length with the exception of a portion immediately adjacent the flange which portion is undercut. In addition, the tubular member passing through the opening in the flange in the flange-to-thread direction and terminating in an end for supporting the nut for rotation thereon, is provided with radially outwardly extending means adjacent the end thereof freely movable within the region of the undercut portion of the nut and engageable with the flange to preclude removal of the nut over the end of the member, and the means is formed for selected threaded engagement with the threads on the nut for permitting the nut to be retracted to expose the end of the member.

The invention will be better understood after reading the following detailed description of several embodiments thereof with reference to the appended drawings in which:

FIG. 1 is a longitudinal half-section through a fluid coupling assembly constructed in accordance with the present invention and showing the coupling nut in its forward operative position on the end of a sleeve or fluid conduit;

FIG. 2 is a view similar to FIG. 1 showing the coupling nut in retracted position;

FIG. 3 is a longitudinal half-section of a coupling nut assembly representing a modification of the structure shown in FIG. 1;

FIG. 4 is a longitudinal sectional view of a fluid coupling assembly showing the invention applied to a ball and socket type of joint;

FIG. 5 is a longitudinal half-section of the fitting of FIG. 4 showing the parts in partly disassembled condition and with their axes slightly misaligned;

Figure 6:
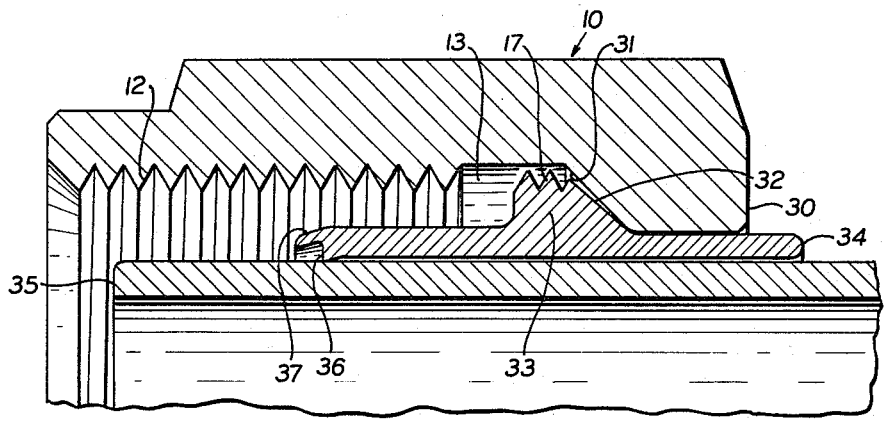
FIG. 6 is a longitudinal half-section of a flareless tube fitting embodying the invention.

Referring now to FIG. 1, the coupling nut 10 having an inwardly directed flange 11 at one end and internal threads 12 throughout its length with the exception of a portion 13 immediately adjacent the flange, which portion is undercut, is mounted upon the tubular end 14 of a fluid conduit. The end 14 may be formed either integral with the conduit or it may take the form of an end piece arranged to be brazed or otherwise secured to a metal pipe or tube. The tubular end or end piece 14 is provided, in the example of FIG. 1, with a conventional conical seat or sealing surface 15 for connection to another tubular member by means of the nut 10. The member 14 is also provided adjacent the end bearing the seal 15 with a radially enlarged portion or shoulder 16 carrying the threads 17 on its radially outer surface. It will be noted from the drawing that the diameter of the enlarged portion 16 taken out to the crest of the threads 17 is greater than the crest diameter and less than the root diameter of the threads 12 on the nut. Also, the axial extent of the enlarged portion 16 is less than the axial extent of the undercut portion 13 of the nut, the diameter of the undercut portion being greater than the diameter of the enlarged portion 16.

With the foregoing construction it should be understood that the radially outwardly extending means 16 is freely movable within the region of the undercut portion 13 of the nut. It should be apparent that the nut flange 11 is positioned on the side of the enlarged portion which is remote from the end carrying the seal 15.

As shown in FIG. 1, the diameter of the undercut portion is the same as the root diameter of the threads 12. However, the diameter of the undercut portion may be varied so long as it is greater than the crest diameter of the threads 17. By the same token, the threads 17 may be truncated in order to provide the necessary clearance between themselves and the undercut portion. However, the threads 17 must have a sufficient diameter to interfere with the threads 12 in order to prevent inadvertent retraction of the nut with respect to the end 14 as shown in FIG. 2.

In FIG. 2 the parts are the same as those shown in FIG. 1 but with the nut retracted, and, therefore the same reference numerals are employed. The parts should be dimensioned so that the nut can not be retracted to the position shown in FIG. 2 without deliberately engaging the threads 17 with the threads 12 and unscrewing them with respect to each other. Unless a deliberate attempt is made to engage these threads, the assembly will remain in the condition shown in FIG. 1 with the nut freely rotatable about the end piece 14.

In FIG. 3 there is shown a modification of the assembly of FIG. 1 in which the threads 17 on the enlarged portion of the end of the member 14 are replaced by a pin 18 secured in a socket 19 in the shoulder 16. For convenience, the same reference numerals are employed in FIG. 3 as were employed in FIGURES 1 and 2 in order to designate the same or similar parts. The thread contours have been selected arbitrarily for purposes of illustration and may be varied in accordance with good design procedure. Naturally, the threads 12 on the nut will be of standard design in order to mate with standard threads on male fittings. In the embodiment of FIG. 3 it will be understood that the various clearances between the nut 10 and the end of the member 14, as well as the size of the pin 18, will be dimensioned such that the pin 18 will always interfere with the threads 12 unless a deliberate unthreading action is imparted thereto. If necessary, additional pins may be located at other points around the circumference of the member 14.

FIGS. 4 and 5 show the invention as applied to a ball and socket type of fitting. Here, the fluid coupling assembly is intended to be joined to a male coupling member 20 externally threaded at 21 and provided with a convex spherical end seat 22 and a fluid passage 23. The member 14 would normally be constructed in the form of a sleeve element having its rear end (not shown) arranged for attachment to a fluid conduit. The end which is visible in the drawing is provided with a first concave spherical bearing surface 24 for engaging the end seat on the male member 20. The external shoulder 16 on the element 14 is provided with a second convex spherical bearing surface 25 concentric with and facing in the opposite direction with respect to the first bearing surface 24. The coupling nut which is mounted on the element 14 is arranged to have radial clearance therebetween. The nut 10 is also provided with an inwardly directed complemental concave spherically faced flange 26 behind and engageable with the second convex spherical bearing surface 25.

As seen in FIG. 4, the parts are fully assembled. It will be apparent that by proper choice of the clearances between the nut and the element 14, a slight amount of cocking can be tolerated between the axis of the male member 20 and the axis of the element 14. This is symbolized in FIG. 5 by the dot-dash lines 27 and 28 representing the axes, respectively, of the male member 20 and the element 14. It will be understood that the intersection of the axes at the point 29 represents, when the parts are fully assembled, the center of the spherical surfaces 22, 24, 25 and 26.

In order to take full advantage of the present invention, it must be possible for the nut 10 to be threaded into mating engagement with the male member 20 with the parts in the position shown in FIG. 5. That is, with the male member 20 already in engagement with the element 14. The drawing shows that the threads 12 on the nut will engage the threads 21 on the male member 20 before leaving the threads 17 on the element 14. If the threads 12 and 21 are of standard construction, the nut will tend to orient its axis with respect to the axis 27 of the male member 21. It has been discovered that cutting back the threads 17 in order to produce a "sloppy" thread, will be adequate to enable the axis 28 of the element 14 to remain in its cocked position. That is, the threads 17 are deliberately made undersize in order to establish a class 1 or poorer fit with the threads 12. It has been found that the normal amount of cocking between the axes of the mating parts need not exceed approximately 5° from alignment. A sloppy fit between the threads 17 and 12 has been found adequate to permit the same degree of misalignment between the nut 10 and the element 14. Thus, the advantages of a coupling nut constructed in accordance with the present invention are added to those obtaining from a self-aligning fitting.

In FIG. 6, the invention is shown applied to a typical flareless tube fitting. The coupling nut 10 having the internal threads 12 and undercut 13, substantially as previously described, is now provided with an inwardly directed flange 30 having an inclined or conical inner surface 31 for engaging the inclined or conical rear surface 32 of the shoulder 33 on the sleeve 34. The shoulder 33 carries the threads 17, as shown.

As is well known, the sleeve 34 is constructed for mounting on the end of a metal tube or conduit 35 and is provided both with a sharp circumferential edge 36 for biting into the surface of the tube and with a so-called parabolic outer sealing surface 37. The latter surface is designed to mate with a complementary surface on a cooperating fitting. In known manner the sleeve 34 is contracted upon the tube 35 during the making of a joint due to the various camming actions built into the fitting. This serves to permanently lock the sleeve 34 to the tube 35.

It can now be appreciated that after the sleeve 34 is locked to the tube 35 as a result of initial assembly, the features of the present invention come into play upon subsequent disconnection of the line by unmaking the joint. As with the other forms of the invention the nut will protect the sealing surface 37 but can be retracted during disassembly or reassembly in order to fit the tube into a tight location.

Figure 7:
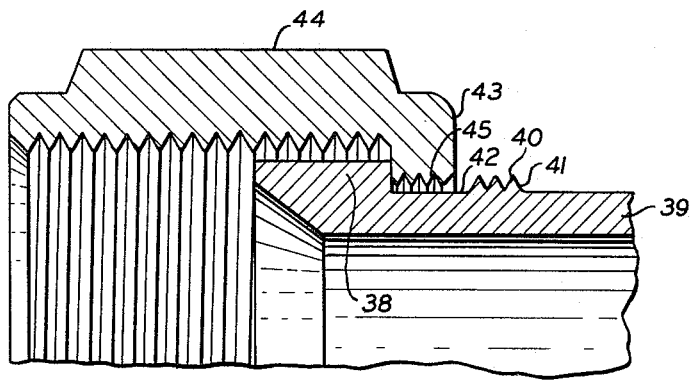
FIG. 7 is a longitudinal half-section of a further embodiment of the invention.

In all of the embodiments of the invention described so far a shoulder on the tube extension or sleeve has been threaded and disposed within the coupling nut in an undercut region. However, it is possible to locate the threads on the sleeve or tubular member outside of the coupling nut on a separate shoulder spaced rearwardly from the main or principal shoulder by a distance slightly greater than the thickness of the flange on the nut. In this case the periphery of the opening through the nut flange is threaded to mate selectably with the last mentioned threads. An example of this type of structure is shown in FIG. 7 wherein the main shoulder is shown at 38 on the tubular member 39 with the threads 40 formed on a separate or auxiliary shoulder 41. The shoulder 41 is spaced from the shoulder 38 to provide a relieved section or unthreaded channel or undercut section 42 having an axial length slightly greater than the thickness of the flange 43 on the nut 44. As shown, the flange 43 has its inner periphery threaded at 45.

The fitting assembly of FIG. 7 operates in much the same manner as the fittings already described. Normally the flange 43 on the nut 44 rides in the channel 42 of the member 39. When, however, it is desired to retract the nut 44, the threads 45 are engaged with the threads 40 and the nut can then be threaded rearwardly along the member 39.

Common to all of the embodiments of the invention is the problem of misalignment between the threads on the shoulders and the threads on the mating male members. In connection with the embodiment of FIGURE 5, the problem of cocking or canting was discussed. However, even if the axes 27 and 28 were aligned, the helical course of the threads 17 might (as a general rule) not be aligned with the course of the threads 21 on the male member. This would give rise to difficulty in meshing the threads 12 of the nut with the threads 21 of the male member while they were still engaged with the threads 17. Fortuitously the sloppy thread fit deliberately built into the threads 17, which accommodates the cocking, will also accommodate to a considerable degree the thread misalignment. Consequently, it is desirable to form the threads 17 in all embodiments undersize in order to provide a sloppy fit and facilitate assembly. A similar approach may be taken with the pin 18 in FIGURE 3.

Likewise, in FIGURE 7, a sloppy fit may be provided between the threads 40 and 45, although, in this particular case, either or both of the threads 40 or 45 can be undersize.

From the foregoing description, it will be apparent to those skilled in the art that various modifications of the generic invention, here disclosed, may be made. It it intended, therefore, to cover all such variations as fall within the scope of the appended claims.

What is claimed is:

1. A fluid coupling assembly of the female type for making connection with an externally threaded male coupling member with a convex spherical end seat and a fluid passage therethrough, said assembly comprising a sleeve element having one end constructed for attachment to a fluid conduit, the opposite end provided with a first concave spherical bearing surface for engaging the end seat on the male member, an external shoulder on said sleeve element with a second convex spherical bearing surface concentric with and facing in the opposite direction with respect to said first concave spherical bearing surface; and a coupling nut mounted on said sleeve element with radial clearance therebetween and with an inwardly directed complemental concave spherically faced flange behind and engageable with said second convex spherical bearing surface, said nut being internally threaded for threadedly engaging said male member to draw said end seat into engagement with said first concave spherical bearing surface, the threads on the nut extending throughout its length with the exception of a relatively short portion immediately adjacent said flange which portion is undercut, a separate auxiliary thread being formed on the outer surface of said external shoulder, said separate thread having a crest diameter greater than the crest diameter of the threads on said nut, an axial length less than the axial length of said undercut portion, and a configuration operatively compatible with the threads on said nut.

2. A fluid coupling assembly according to claim 1, wherein said separate thread is dimensioned relative to the threads on the nut such that when the two last mentioned threads are operatively engaged the axis of the nut is permitted to cock relative to the axis of the sleeve element to an extent at least as great as the cocking permitted between said sleeve element and said male member.

3. A fluid coupling assembly of the female type comprising a coupling nut having an inwardly directed flange at one end and internal threads throughout its length with the exception of a relatively short portion immediately adjacent said flange which portion is undercut; and a tubular end piece supporting said nut for rotation thereon, said end piece having a first end for connection to another tubular member by means of said nut, an opposite end for connection to a fluid conduit member, a radially enlarged portion adjacent said first end of the end piece, and threads on the radially outer surface of said enlarged portion for threaded engagement with the threads on said nut, the diameter of said enlarged portion being greater than the crest diameter and less than the root diameter of the threads on said nut, the axial extent of said enlarged portion being less than the axial extent of the undercut portion on the nut, the diameter of said undercut portion being greater than the diameter of said enlarged portion, the flange on said nut being disposed on the side of said enlarged portion remote from said first end of the end piece with the remainder of the nut extending in the direction of said first end of the end piece, and the threads on said nut being of standard construction while the threads on said enlarged portion are formed to make a class 1 or poorer fit with the threads on the nut.

4. A fluid coupling assembly according to claim 3, wherein the threads on said enlarged portion are formed undersize relative to the standard threads on said nut.

5. A fluid coupling assembly of the female type comprising a coupling nut having an inwardly directed flange at one end with a central opening therethrough and having internal threads throughout its length with the exception of a relatively short portion immediately adjacent said flange which portion is undercut; and a tubular member passing through said opening in the flange in the flange-to-thread direction and terminating in an end for supporting said nut for rotation thereon, said member being provided with a radially outwardly extending annular shoulder adjacent said end thereof freely movable within the region of said undercut portion of the nut and engageable with said flange to preclude removal of said nut over said end of the member, said shoulder having a diameter intermediate that of the crest of said threads and the opening through said flange; and a separate thread of at least one turn formed on the outer surface of said shoulder; said separate thread having a crest diameter which is greater than the crest diameter of the threads on said nut, an axial length less than the axial length of said undercut portion, and a configuration operatively compatible with the threads on said nut, but differing therefrom sufficiently to make a class 1 or poorer fit with the threads on the nut.

6. A fluid coupling assembly of the female type for making connection with an externally threaded male coupling member with a non-planar end seat and a fluid passage therethrough, said assembly comprising a sleeve element having one end constructed for attachment to a fluid conduit, the opposite end provided with a non-planar surface complemental to and for engaging the end seat on the male member to establish a fluid tight seal therewith, an external shoulder on said sleeve element, and a coupling nut mounted on said sleeve element with radial clearance therebetween and with an inwardly directed flange behind and engageable with said shoulder, said nut being internally threaded for threadedly engaging the threads on said male member to draw said end seat into sealing engagement with said non-planar surface, the threads on the nut extending throughout its length with the exception of a relatively short portion immediately adjacent said flange which portion is undercut, a separate auxiliary thread being formed on the radially outer surface of said external shoulder, said separate thread having a crest diameter greater than and a root diameter less than the crest diameter of the threads on said nut, an axial length less than the axial length of said undercut portion and short compared to the axial length of the threads on said male member, and a configuration and size operatively compatible with the threads on said nut.

References Cited by the Examiner

UNITED STATES PATENTS

| | | | |
|---|---|---|---|
| 184,723 | 11/1876 | Parsons | 285—354 |
| 335,101 | 2/1886 | Adams | 285—386 |
| 869,662 | 10/1907 | Snyder | 285—12 |
| 896,204 | 8/1908 | Glauber | 285—354 |
| 1,392,363 | 10/1921 | Shannon | 285—117 |
| 1,777,977 | 10/1930 | Lemte | 285—355 |
| 1,829,101 | 10/1931 | McGeorge | 285—261 |
| 2,229,669 | 1/1941 | Oremus | 285—386 |
| 2,429,079 | 10/1947 | Smith | 285—390 |
| 2,857,176 | 10/1958 | McTaggart | 285—382.7 |
| 2,951,715 | 9/1960 | Bauer | 285—382.7 |
| 2,988,385 | 6/1961 | Foelster | 285—354 |

FOREIGN PATENTS

| | | |
|---|---|---|
| 127,258 | 11/1931 | Austria. |
| 1,104,282 | 6/1955 | France. |
| 11,728 | 12/1947 | Great Britain. |
| 18,866 | 9/1899 | Great Britain. |

CARL W. TOMLIN, *Primary Examiner.*

EDWARD C. ALLEN, *Examiner.*